Jan. 8, 1935.  H. E. IVES  1,987,443
RELIEF PICTURE IN NATURAL COLORS
Filed Sept. 30, 1931  2 Sheets-Sheet 1
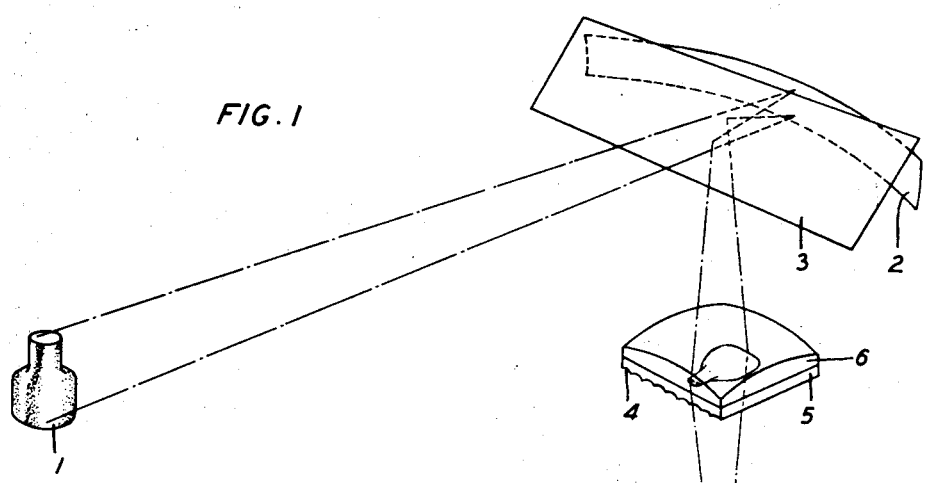
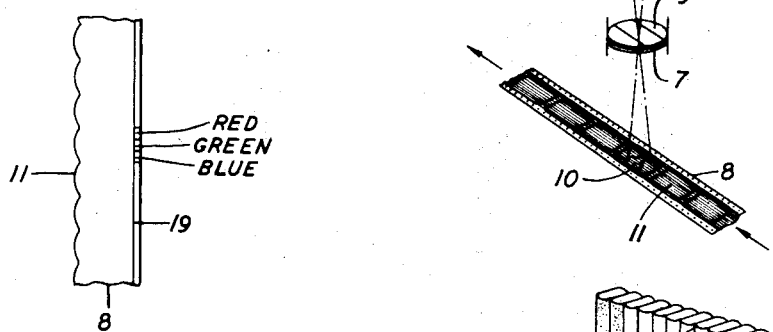
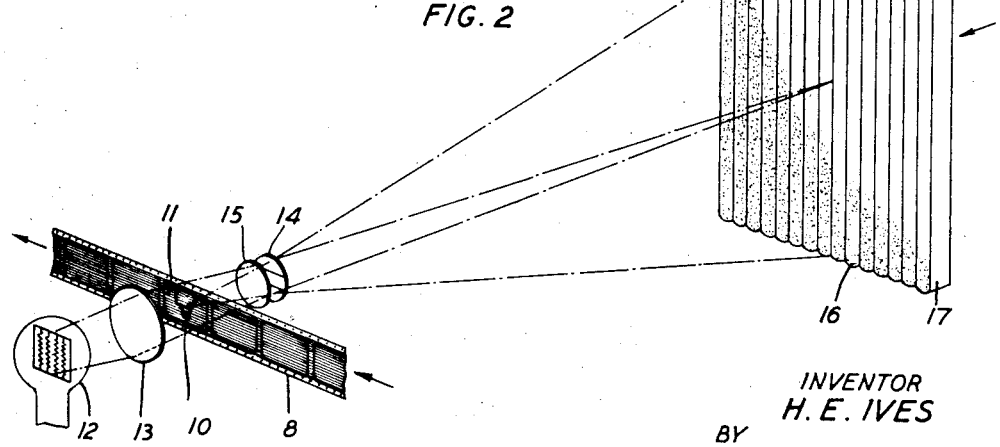
INVENTOR
H. E. IVES
BY
Stanley B. Kent.
ATTORNEY Jan. 8, 1935.  H. E. IVES  1,987,443
RELIEF PICTURE IN NATURAL COLORS
Filed Sept. 30, 1931  2 Sheets-Sheet 2
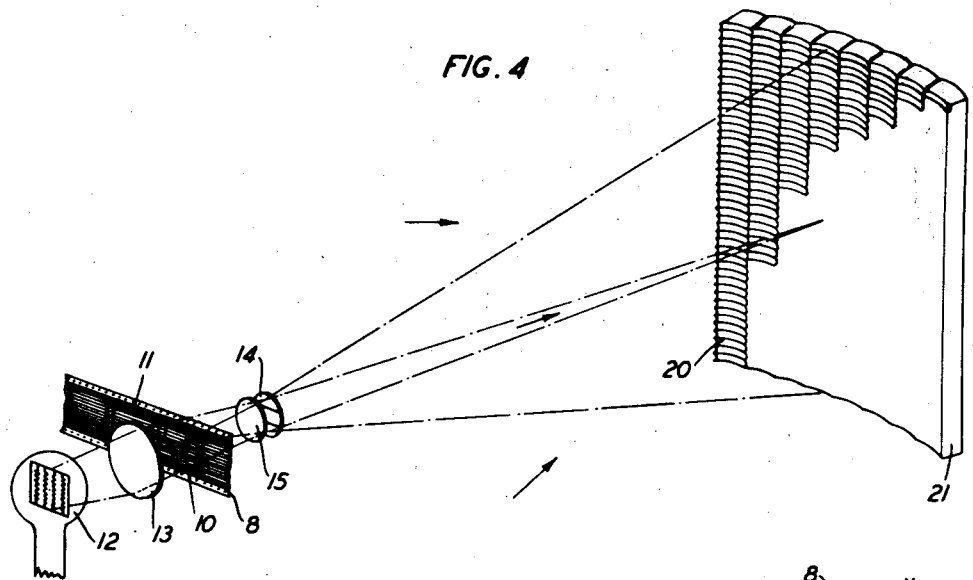
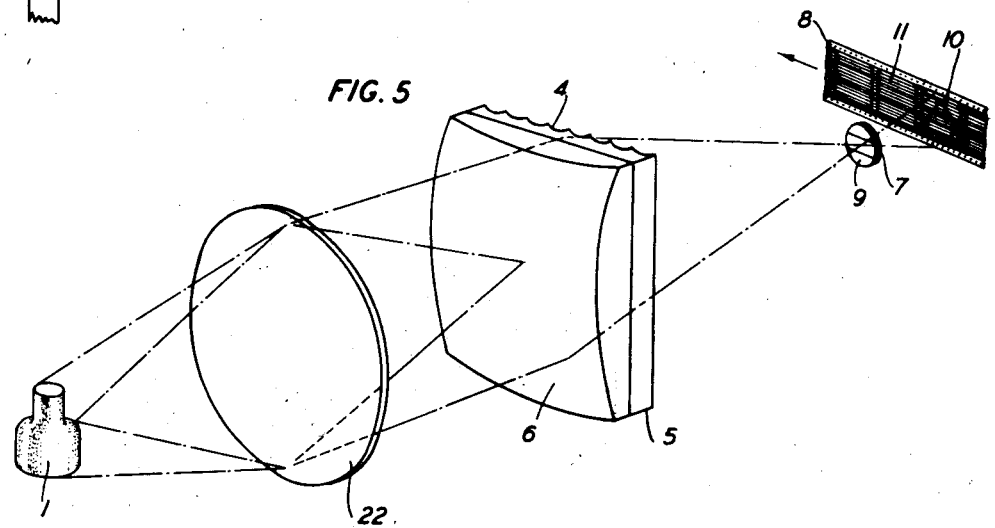
INVENTOR
H. E. IVES
BY
Stanley B. Kent
ATTORNEY Patented Jan. 8, 1935

1,987,443

UNITED STATES PATENT OFFICE 1,987,443

RELIEF PICTURE IN NATURAL COLORS

Herbert E. Ives, Montclair, N. J., assignor to Bell Telephone Laboratories, Incorporated, New York, N. Y., a corporation of New York Application September 30, 1931, Serial No. 565,956

11 Claims. (Cl. 88—164)

This invention relates to the producing of stereoscopic relief pictures in natural colors and more particularly to producing steroscopic parallax panoramagram records on lenticular film which, on projection, present pictures visible in natural colors and stereoscopic relief.

An object of the invention is to provide an arrangement for producing stereoscopic relief pictures in natural colors, through the intermediary of a black and white color record formed from a plurality of points of view.

An over-all straightforward system which is illustrative of this invention, comprises relief picture taking and projecting apparatus in combination with ridged lenticular film and red, green and blue filters, such as are used in three color systems of color photography, for producing stereoscopic relief pictures in natural colors.

In one arrangement illustrative of the invention, a large strip concave spherical mirror and a semi-transparent reflector are arranged to focus an image of a desired object upon a screen or grating such as a sheet of glass or celluloid, which has one flat smooth surface and an opposite ribbed surface formed by a plurality of parallel concave cylindrical grooves. The image of the object is formed as sharply as possible upon these concave grooves. On the flat smooth side of the screen and in close contact therewith is positioned a large plano-convex spherical lens. This lens is of such strength that it causes the image forming light rays to completely fill the grooves of the screen far removed from the center axes of the large mirror, and also directs light from the large mirror into a small photographic lens from all points of the screen. This small photographic lens is placed at a suitable distance on the side of the screen opposite the large plano-convex lens, and photographs in reduced size an image of the screen upon a light sensitive lenticular film. Interposed between the small photographic lens and the grooved surface of the screen is a red, green and blue filter of the type used in producing black and white color records. The ridged surface of the lenticular light sensitive film faces the small photographic lens which photographs an image of the screen through the color filter upon the light sensitive film. The lenticular elements of this film cause the photographic emulsion on the side of the film opposite the ridges to be exposed to three juxtapositioned linear color record images behind each lenticular ridge. With the arrangement described above, a stereoscopic parallax panoramagram black and white color record is produced upon the photographic emulsion of the lenticular film.

The three color filter and lenticular film described above are the type used in the Kodacolor process, a description of which is given in the Photographic Journal for September, 1929, pages 404 and 405. To prevent moiré patterning in the parallax panoramagram image produced on the lenticular film, the latter is positioned so that its lenticular ridges lie at right angles to the longitudinal axes of the concave cylindrical grooves of the screen from which the object image is photographed.

The exposed lenticular film bearing the stereoscopic parallax panoramagram color record is developed using the reversing process to form a positive. This positive is passed through a projection apparatus which projects each of the parallax panoramagram color records upon a double convex cylindrical lenticular type of viewing screen from which the projected images are viewed as stereoscopic pictures in natural colors. The precaution is taken here also to position the film in the projection apparatus such that the lenticular ridges of the film lie at right angles to the longitudinal axes of the elongated lenticular elements of the viewing screen. The projection apparatus comprises a light source and lens on one side of the film, and on the opposite side, suitably positioned, a three color filter, similar to the one used in the taking apparatus, and a small objective lens.

The viewing screen described above is of the type disclosed in H. E. Ives Patent No. 1,883,290, patented October 18, 1932. Alternate forms of viewing screens which are also applicable to this invention are shown in H. E. Ives Patent No. 1,937,118, patented November 28, 1933.

An alternate arrangement for the taking apparatus, also illustrative of this invention, comprises a large diameter lens instead of the large concave strip mirror. The lens forms an image of the object as sharply as possible upon the concave grooves of a screen like the one described above. The remainder of the apparatus is identical with that disclosed above in connection with the large mirror.

This invention also comprises systems in which pseudoscopic parallax panoramagrams are made and projected on suitable types of viewing screens to produce pictures visible in natural colors and stereoscopic relief.

The invention will now be described more in detail having reference to the accompanying drawings.

Fig. 1 is a diagrammatic showing of an arrangement for making stereoscopic parallax panoramagram color records.

Fig. 2 is a diagrammatic showing of an arrangement for projecting stereoscopic parallax panoramagram color records for viewing as pictures in natural colors and stereoscopic relief.

Fig. 3 is a fragmentary showing of the lenticular film shown in Figs. 1 and 2.

Fig. 4 is a diagrammatic showing of an alternative arrangement for the projection apparatus of Fig. 2.

Fig. 5 is a diagrammatic showing of an alternative arrangement for the taking apparatus of Fig. 1.

Referring now to Fig. 1, a large diameter concave cylindrical strip mirror 2 and a semi-transparent reflector 3 are arranged to form an image of the object 1 upon the concave grooved surface 4 of the transparent grating 5. A large planoconvex lens 6 is positioned in close contact with the grating 5. This lens serves the purpose of collecting all of the image forming light rays from the object 1 to fill the entire grooved surface 4 of the grating 5. For a more detailed description of this apparatus reference may be had to H. E. Ives Patent No. 1,960,011, patented May 22, 1934. The image forming light rays after passing through the grating 5 are focused by a small photographic lens 7 upon a light sensitive film 8. This film is of the ridged lenticular type used in making black and white color records. A three color sectored filter 9 having red, green and blue color sections is positioned very close to the lens 7 in the path of the image forming light rays coming from the grating 5. Light rays emanating from all points of the object 1 are transmitted through the three color sections of the sectored filter 9. These light rays form on the film 8 a stereoscopic parallax panoramagram color record 10 of the object 1. A series of these records is made by moving the film 8 in the direction indicated by the arrow. The film is moved intermittently and a shutter, not shown, is employed to expose only one frame at a time. The film 8 is positioned so that its ridges, or lenticular elements 11, lie at right angles to the longitudinal axes of the concave grooves 4 of the grating 5. The color filter 9 is also positioned so that its longitudinal sections lie at right angles to the longitudinal axes of the grooves 4. This precaution is taken so that the double structured stereoscopic parallax panoramagram color record 10 will not have moiré patterning, the structures being formed on the film 8 at right angles to each other. This double structured color record comprises a plurality of stereoscopically positioned parallax panoramagram strip images and superimposed on them a plurality of juxtapositioned linear color records lying at right angles to the strip images. The film 8 bearing the plurality of stereoscopic parallax panoramagram color records 10 is run through the projecting apparatus of Fig. 2 to project these color records for viewing as pictures in natural colors and stereoscopic relief.

Referring now to Fig. 2, a light source 12, a condensing lens 13, a three color filter 14, and a projection lens 15 are arranged to project the series of color records 10 from the film 8 upon the rear convex cylindrical lenticular light diffusing surface 16 of the screen 17. The projected color records are viewed from the opposite side of the screen, in the direction indicated by the arrow, as pictures in natural colors and stereoscopic relief. The film 8 is positioned in the projecting apparatus so that the longitudinal axes of the ridges, or lenticular elements, lie at right angles to the longitudinal axes of the cylindrical elements of the screen 17. This arrangement conforms to the arrangement in the taking apparatus and causes the images projected on the screen 17 to appear in relief and without moiré pattern. The size and number of the optical elements of the screen 17 may vary within wide limits depending principally upon the degree of resolution desired in the relief pictures. As an example of practice, this type of screen may be made two feet square and composed of approximately two hundred celluloid rods three-eighths inch thick, two feet long, and approximately three-sixteenths inch wide, placed side by side with their rear surfaces sand-blasted to produce diffusion. This screen is of the type described above and previously disclosed in Patent No. 1,883,290 supra. The film 8 is moved transversely through the projecting apparatus in the direction indicated by the arrows. The movement is intermittent and a shutter is used to expose only one picture at a time.

The section of lenticular film shown in Fig. 3 is of the type used in the taking and projecting apparatus. It comprises a multiplicity of ridges or cylindrical lenticular elements 11 and a photographic light sensitive emulsion backing 19. This film is placed in the taking apparatus (Fig. 1) with its lenticular ridged surface 11 facing the photographic lens 7 and color filter 9 so that during exposure three minute linear color records corresponding to the red, green and blue color components of the object 1 are formed on the emulsion 19 behind each ridge 11.

Referring now to Fig. 4 the projecting apparatus there shown is like the projecting apparatus of Fig. 2 except that the screen 21 is of the concave grooved reflecting type as distinguished from the convex cylindrical translucent type of screen 17 in Fig. 2. The operation of this projection apparatus is like that described above for the apparatus in Fig. 2. The projected color records in Fig. 4, however, are viewed from the side of the screen toward the projector since the surface 20 of screen 21 is mirror-like reflecting. The size and number of the optical elements of screen 21, may vary as with screen 17 within wide limits depending principally upon the degree of resolution desired in the relief picture. As an example of practice, this type of screen may be made from a metal sheet two feet square with approximately two hundred concave grooves two feet long and three-sixteenths inch wide formed side by side upon its front surface and parallel ridges approximately forty to the inch formed at right angles to the concave grooves across the face of the screen to cause diffusion. For further details of this type of screen reference may be had to Patent No. 1,937,118 supra.

The taking apparatus of Fig. 5 is an alternative arrangement for the taking apparatus shown in Fig. 1. The two arrangements are the same except that in Fig. 5 a large lens 22 is substituted for the large mirror 2 and semi-transparent reflector 3 of Fig. 1. The color records produced on the film 8, Fig. 5, are exactly the same as the color records produced on the film 8 of Fig. 1. The parallax panoramagram color records produced either by the apparatus of Fig. 1 or of Fig. 5 can be projected by either the projection apparatus of Fig. 2 or of Fig. 4, to produce stereoscopic pictures in natural colors.

Various modifications of the arrangements disclosed herein come within the purview of this invention, the scope of which is limited only by the appended claims.

What is claimed is:

1. In a system for producing stereoscopic pictures in natural colors, means to form a linear black and white color record of an object from a plurality of points of view, a lenticular screen having a linear structure, and means to project on said lenticular screen the linear color records so that the linear structure of the record is at an angle to the linear structure of the screen to obviate moiré patterning.

2. In a system for producing stereoscopic pictures in natural colors, means to form a parallax panoramagram black and white color record, a plurality of elemental concave mirror-like reflecting surfaces arranged side by side to constitute a viewing screen, a projecting lens to project said parallax panoramagram color record upon said screen, each element of said screen utilizing the light from said projecting lens to form a real image of said lens, and a plurality of color filters composing a set of primary colors corresponding to said color records interposed between said record and said screen to divide the image forming light beam into certain portions of the spectrum.

3. In apparatus for producing stereoscopic parallax panoramagram color records, means for forming a single composite image of an object from a wide angle of view, lenticular screen means grooved on one side for forming from said single image a plurality of virtual strip images, a lenticular film, means to photograph said screen from the grooved side upon said lenticular film, and means interposed between said screen and said photographic means to divide the image forming light rays into a plurality of spectral bands.

4. In apparatus for producing stereoscopic parallax panoramagram color records, means to form an image of an object through a wide angle of view, a screen of transparent material located in the image space having a plurality of concave cylindrical grooves on one face, a ridged lenticular light sensitive emulsion carrying element positioned with said ridges running at right angles to the longitudinal axes of the concave cylindrical grooves of said transparent screen, photographic means positioned between said screen and light sensitive element to photograph said screen from the groove side upon said light sensitive element, and means positioned between said screen and photographic means to form from the image forming light rays a plurality of light bands corresponding to the various color components of the object.

5. In apparatus for producing a stereoscopic parallax panoramagram color record, means to form an image of an object by light rays converging through a wide angle, a screen of transparent material located substantially in the image space, said screen having concave cylindrical grooves on the face away from said image forming means and a plano-convex lens on the opposite side to diverge the light rays coming from said image-forming means to cover the entire surface of said concave grooves, a lenticular light sensitive film, means to photograph said screen from the grooved side upon said lenticular film, and color selection means interposed between said film and said screen to direct the image forming light rays to said film in separate spectral bands.

6. In a system for producing pictures in natural colors and stereoscopic relief, apparatus comprising a large diameter concave spherical strip mirror for imaging an object from a plurality of points of view, means for forming a plurality of virtual strip images of said mirror corresponding to elemental portions of said object, a lenticular light sensitive film, and means to photograph on said film said plurality of virtual strip images to form thereon a plurality of juxtapositioned linear color records.

7. A lenticular photographic film having a multiplicity of microscopic lenticular elements on one side and on the opposite side a layer of developed light sensitive emulsion having formed therein a plurality of stereoscopically positioned parallax panoramagram strip images and a plurality of juxtapositioned linear color records lying at right angles to the longitudinal axes of the said strip images.

8. In a system for producing pictures in natural colors and stereoscopic relief, means to form an image of an object by light rays converging through a wide angle, a concave grooved screen of transparent material upon which said image is formed, a lenticular ridged light sensitive film suitably positioned away from said screen and having its ridges running at right angles to the longitudinal axes of the concave grooves of said screen, a photographic lens and a color filter to photograph said screen from the grooved side upon said lenticular film to form thereon a stereoscopic parallax panoramagram color record, a light diffusion viewing screen having a plurality of translucent concave cylindrical lenticular elements arranged side by side, a projection lens and a second color filter arranged to project said parallax panoramagram color record from said lenticular film upon the rear surface of said viewing screen, the ridges of said lenticular film being positioned at right angles to the concave cylindrical elements of said viewing screen to prevent moiré patterning.

9. In a system for producing pictures in natural colors and stereoscopic relief, apparatus comprising a large diameter lens for imaging an object from a plurality of points of view, means for forming a plurality of virtual images of said large lens corresponding to elemental portions of the object, a ridged lenticular light sensitive film, a photographic lens and color filter positioned between said film and image forming means to photograph said plurality of virtual images upon said lenticular film to form thereon a stereoscopic parallax panoramagram color record, a plurality of elemental concave mirror-like reflecting surfaces arranged side by side to constitute a viewing screen, a projection lens and another color filter for projecting said color record formed on the lenticular film upon the reflecting surface of said viewing screen, the lenticular ridges of said film being positioned at right angles to the longitudinal axis of the concave cylindrical elements of said viewing screen.

10. A stereoscopic parallax panoramagram color record formed on a ridged lenticular film, comprising a plurality of strip images of an ojbect each taken from a slightly different point of view, and a plurality of juxtapositioned linear color records lying at right angles to the longitudinal axes of said strip images.

11. In a system for producing stereoscopic pictures in natural colors, means to form a linear black and white color record of an object from a plurality of points of view, a screen having a linear structure which is adapted to direct horizontally adjacent substantially parallel light rays incident thereon in different horizontal directions, and means to project on said screen the linear color records so that the linear structure of the records is at an angle to the linear structure of the screen to obviate moiré patterning.

HERBERT E. IVES.